Oct. 11, 1938.   J. F. TURNER ET AL   2,133,156
STOKER TIMING AND ACTUATING MECHANISM
Filed Aug. 8, 1934   10 Sheets-Sheet 1

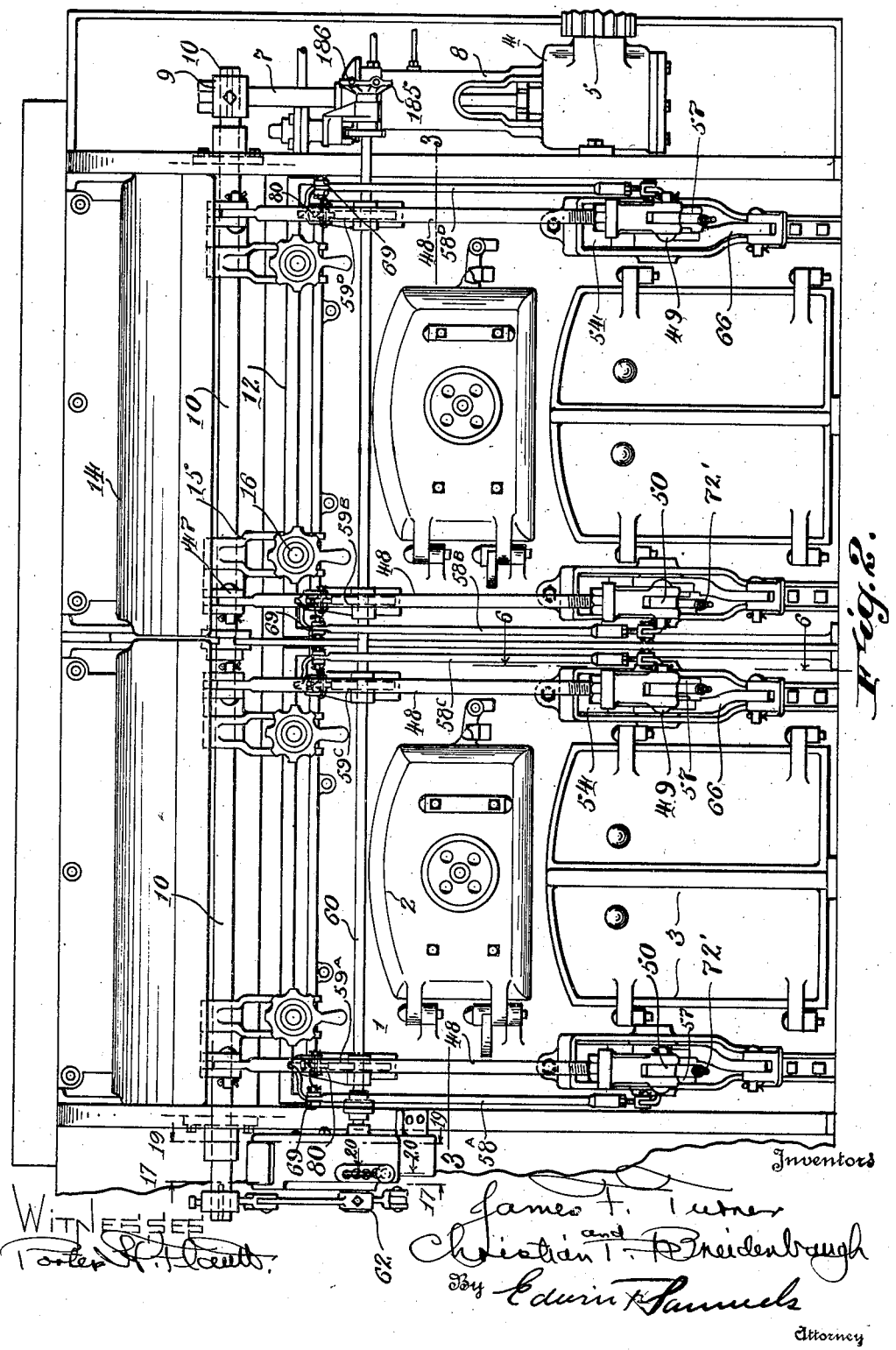

Oct. 11, 1938.  J. F. TURNER ET AL  2,133,156
STOKER TIMING AND ACTUATING MECHANISM
Filed Aug. 8, 1934   10 Sheets-Sheet 3
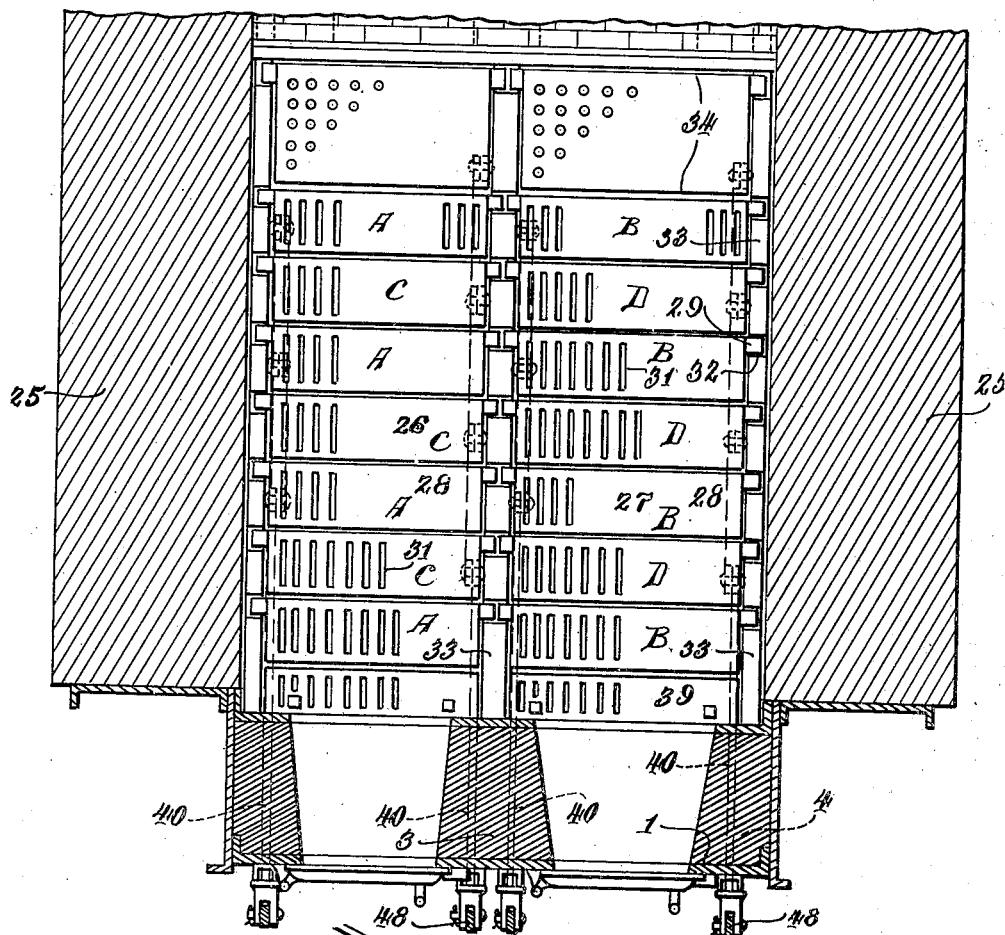

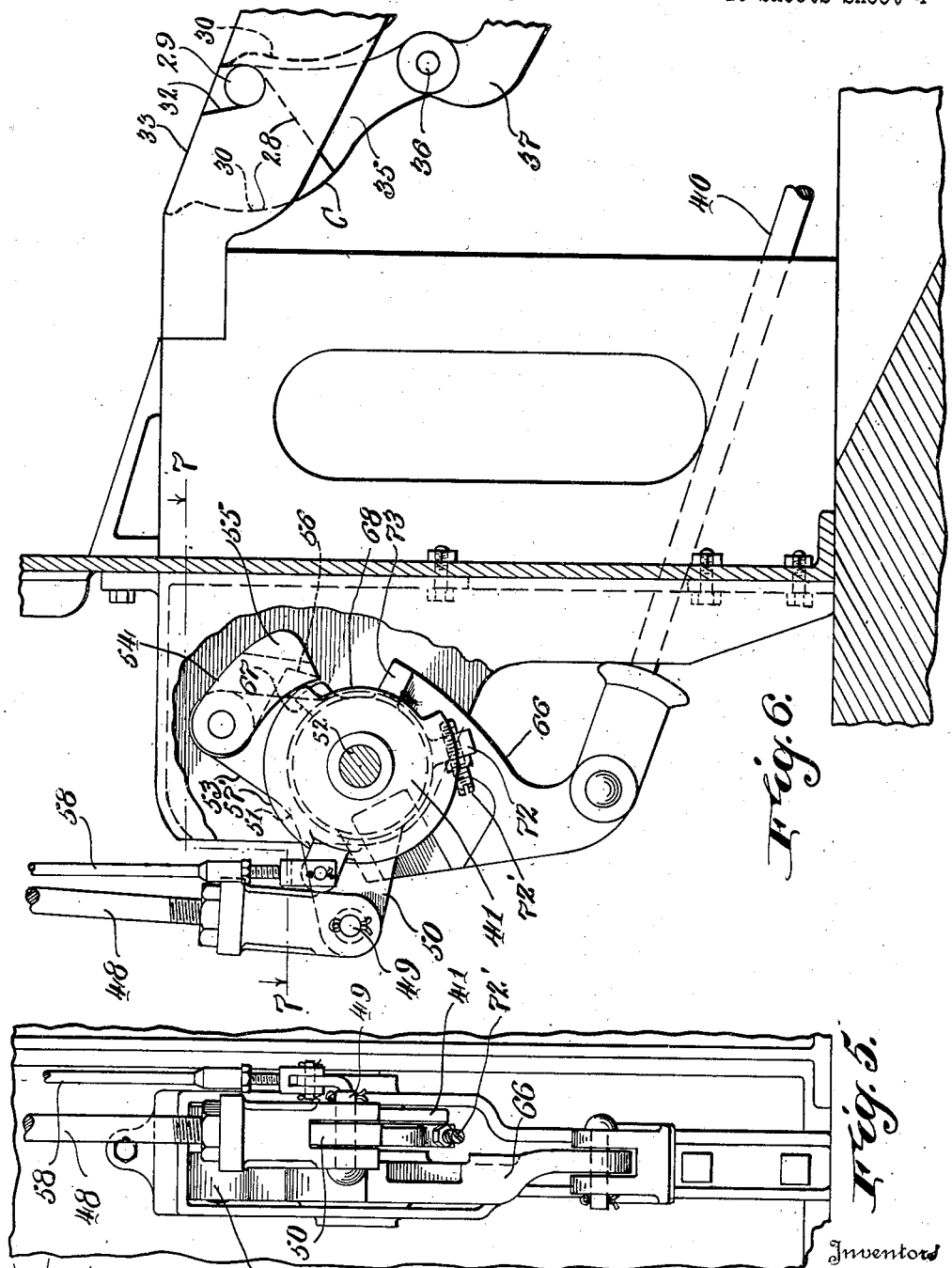

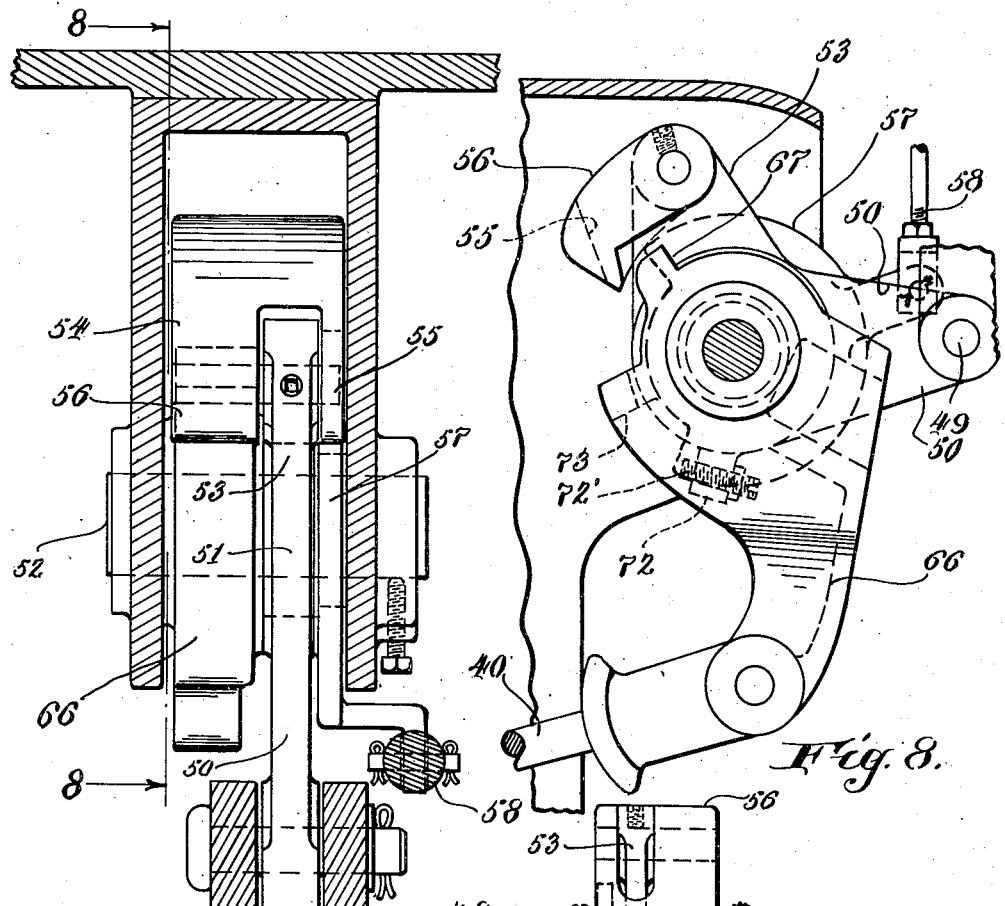

Oct. 11, 1938.   J. F. TURNER ET AL   2,133,156
STOKER TIMING AND ACTUATING MECHANISM
Filed Aug. 8, 1934   10 Sheets-Sheet 6

Oct. 11, 1938. J. F. TURNER ET AL 2,133,156
STOKER TIMING AND ACTUATING MECHANISM
Filed Aug. 8, 1934 10 Sheets-Sheet 8

Oct. 11, 1938.   J. F. TURNER ET AL   2,133,156

STOKER TIMING AND ACTUATING MECHANISM

Filed Aug. 8, 1934   10 Sheets-Sheet 9

Oct. 11, 1938.  J. F. TURNER ET AL  2,133,156
STOKER TIMING AND ACTUATING MECHANISM
Filed Aug. 8, 1934  10 Sheets-Sheet 10
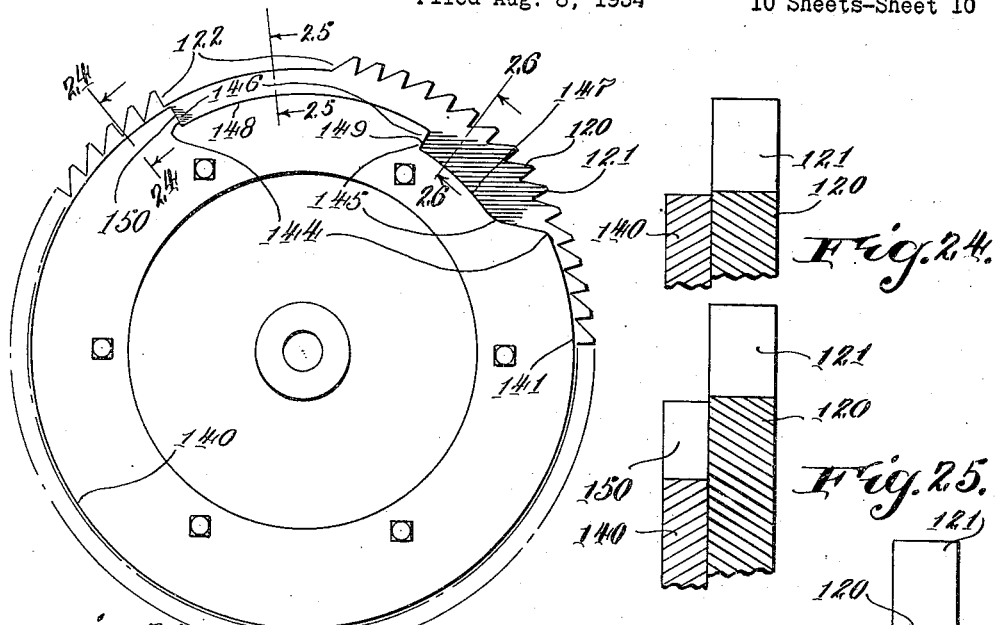
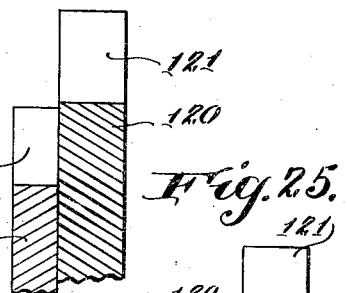
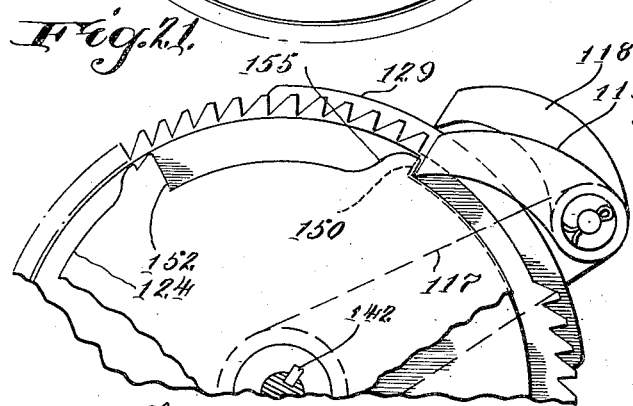
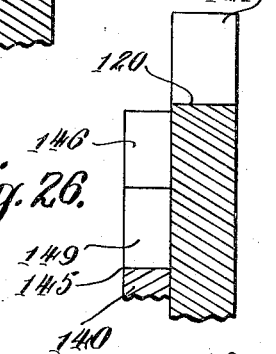
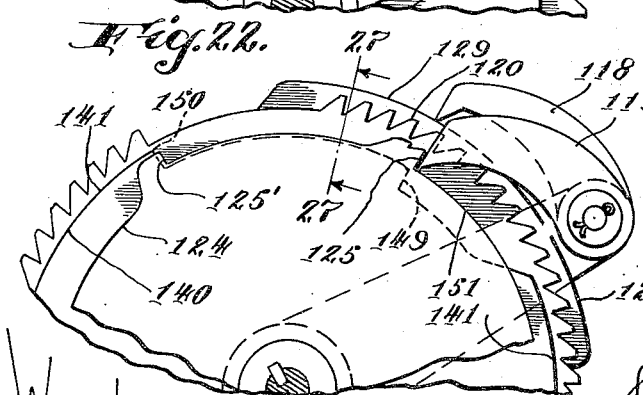

UNITED STATES PATENT OFFICE 2,133,156

STOKER TIMING AND ACTUATING MECHANISM

James F. Turner and Christian P. Breidenbaugh, Baltimore, Md., assignors to Flynn & Emrich Company, Baltimore, Md., a corporation of Maryland Application August 8, 1934, Serial No. 738,914

15 Claims. (Cl. 110—32)

The invention relates to a time control and operating mechanism for an overfeed stoker or stoking grate of the rocking bar type and other types capable of being operated and controlled in a similar manner.

The stoker in connection with which the control mechanism of the invention has been developed, is described as to the arrangement of the rocking bars, etc., in Huber Patent No. 1,845,415, dated February 16, 1932, though it is capable of use with various types of overfeed stokers or stoking grates in which a pull rod or similar mechanism is used to operate the bars or other corresponding elements to move the coal backwardly through the combustion area, breaking the fire and clinkers and dropping the ash and moving the remaining clinkers and other material not discharged downwardly through the grate, backwardly to the drop bar or other mechanism provided for disposing of such material. It is also applicable to the intermittent operation of various stoking apparatus.

The stoker to which the control apparatus of the invention has been applied in practice comprises one or any sufficient number of grate areas arranged in any suitable manner usually side by side in a corresponding furnace or furnaces, and each grate area in the form of stoker shown consists of a series of arcuate slotted bars extending transversely, the respective bars being pivoted at each end near the rear side to swing upwardly and backwardly in the direction of the bridge wall, each bar being provided with a downwardly projecting arm by which it is operated. In accordance with the practice to which the invention has been applied, the bars of each series composing each unit of grate area are arranged in two sets of alternate bars, the bars of each set being connected to a corresponding pull rod by which the bars of that set are rocked upwardly and backwardly in the direction of feed and in the direction of the bridge wall when tension is applied to the pull rod drawing it forwardly toward the fire door, i. e., oppositely to the direction of the feed. In the operation of the furnace the pull rods or other connections are operated successively, the respective sets of alternate bars in each unit being thus rocked alternately.

With the degree of attention that can ordinarily be given to the operation of such a stoker it has been found that with the previous types of apparatus the pull rod actuating and timing mechanism frequently gets out of time so that several of the pull rods are moved simultaneously placing an excessive and sometimes insupportable load on the motor and also at times causing the two sets of stoker or grate bars in a single grate area or unit to be operated simultaneously with the result that the burning fuel is dropped, and there is a very large percentage of loss of economy. Also, at times, due to the improper operation of the timing mechanism and from other causes the motor is overloaded and slowed down or even stopped with a consequent failure of the stoking mechanism to provide the necessary feeding and stoking of the fire. Under these circumstances there is loss of efficiency and a tendency to burn the stoker bars with the result that they must be frequently replaced.

The object of the present invention is to provide a mechanical timing and control mechanism, particularly adapted for use with an overfeed stoker, though it is capable of more general application either as a whole or as to its various elements. This includes separate actuating mechanism for each set of stoker members or grate bars, each such actuating mechanism being separately and positively timed by separate positively related timing elements or controls, one for each set of stoker members and each actuating unit, said timing elements being in the preferred form each separately and positively connected to a single timing member operated from the motor through a timing gear.

This arrangement avoids any change of the relative timing of the sets of grate bars with the consequent overloading above described, due to simultaneous operation of two or more sets.

The invention also provides a booster under control of the timing mechanism in accordance with the timing of the respective units giving two important improved results, the first being that when the operation of the stoker motor would be discontinued as by throttling to stop the stoker the booster serves to continue the operation of the stoker until the stoker reaches a point in its operation in which all of the stoker bars lie flat in the grate so that none of them are exposed to burning, the booster then permits the stoker to stop.

In the drawings the booster is shown in the form of a valve connected to a supply of motor fluid under pressure and to the motor to give excess power when the booster valve is open. When the stoker reaches the proper position above described, the valve is automatically closed and the throttle having been closed, the motor is stopped and the operation of the stoker discontinued with the sets of stoker members all withdrawn to normal position in the grate surface.

The second improved result is that control of this booster by the timing mechanism also has the effect of supplying an excess of power during each operation of a pull rod. When a booster valve is used as herein described, an excess of power is generated by the motor during each stoking operation, giving an excess of power when it is needed and conserving the power between operations. With this or any equivalent type of booster thus controlled, the motor is operated at a sufficient speed with a small supply of motor fluid and a small expense of power between the operations of the respective pull rods, thus not only giving freely all the power that is desired at the periods of operation, but effecting a very considerable economy of power in the running of the motor between stoking operations.

It is of interest that due to the arrangement of the timing and actuating mechanism whereby the operations of the various sets of stoker bars are effected in series and are definitely separated and spaced apart, the requirements of power are greatly reduced, a further reduction being effected by the use of the booster valve so that a hydraulic motor can be used which is operable by the ordinary water supply at normal low pressure.

In the accompanying drawings we have illustrated a stoker control and operating mechanism, embodying the features of the invention in the preferred form, together with so much of an overfeed stoking grate to which the invention is applied as is deemed necessary for a full understanding of the method of constructing, applying, operating and using the device of the invention.

In the drawings:

Figure 2 is an elevation of the furnace front with an assembly of the actuating and timing mechanism.

Figure 3 is a plan of an overfeed stoker or stoking grate, the furnace walls being shown in section on the line 3, 3 in Figure 2.

Figure 4 is a perspective view of one of the timing cams and the immediately adjacent parts of the mechanism including the rock shaft and fuel pusher and hopper.

Figure 5 is a front view on a large scale of the pull rod actuating mechanism.

Figure 6 is a side elevation looking from the right in Figure 2 at one of the pull rod actuating units, the front wall of the furnace being sectioned on the line 6, 6 in Figure 2, from which the view is taken, the front portion of one of the stoking grate units being also shown in elevation.

Figure 7 is a sectional plan of a pull rod actuating unit taken on the line 7, 7 in Figure 6, the front wall of the furnace and the bracket supporting said mechanism being shown in section on said line.

Figure 8 is a section on the line 8, 8 in Figure 7 looking in the direction of the arrows, i. e., from the left.

Figure 9 is a rear view of the pull rod actuating mechanism, looking from the left in Figure 8.

Figure 21 is a view taken from the right in Figure 2, showing the timing ratchet substantially in the position in which it is located in Figure 19, the pawl shield which controls the pawl for the heavy duty ratchet being shown in connection therewith in the relation which it bears in the assembled mechanism.

Figure 22 is a fragmentary view looking from the right in Figure 2 showing the two ratchets, the two shields and the pawls in the relation which they occupy just prior to the operation of the pull rods for actuating the individual sets of stoker members and stoker bars separately and in turn.

Figure 23 is a view similar to Figure 22 showing the position of the ratchets, pawls and shields at the end of the forward and return stroke of the pawls which is about to take place in Figure 22, the parts being ready for the next forward stroke, the beginning of the third operative stroke of the pawls being illustrated in Figure 19.

Figure 24 is a fragmentary section on a radial plane of the axis through the timing ratchet and through the shield which controls the operation of the pawls on the heavy duty ratchet, the same being taken on the plane of line 24, 24 in Figure 21.

Figure 25 is a similar section on the line 25, 25 in Figure 21.

Figure 26 is a fragmentary section through the same parts on the line 26, 26 in Figure 21.

Figure 27 is a section through both ratchets and both shields taken on the radial plane of the axis indicated by line 27, 27 in Figure 23.

Figure 1:
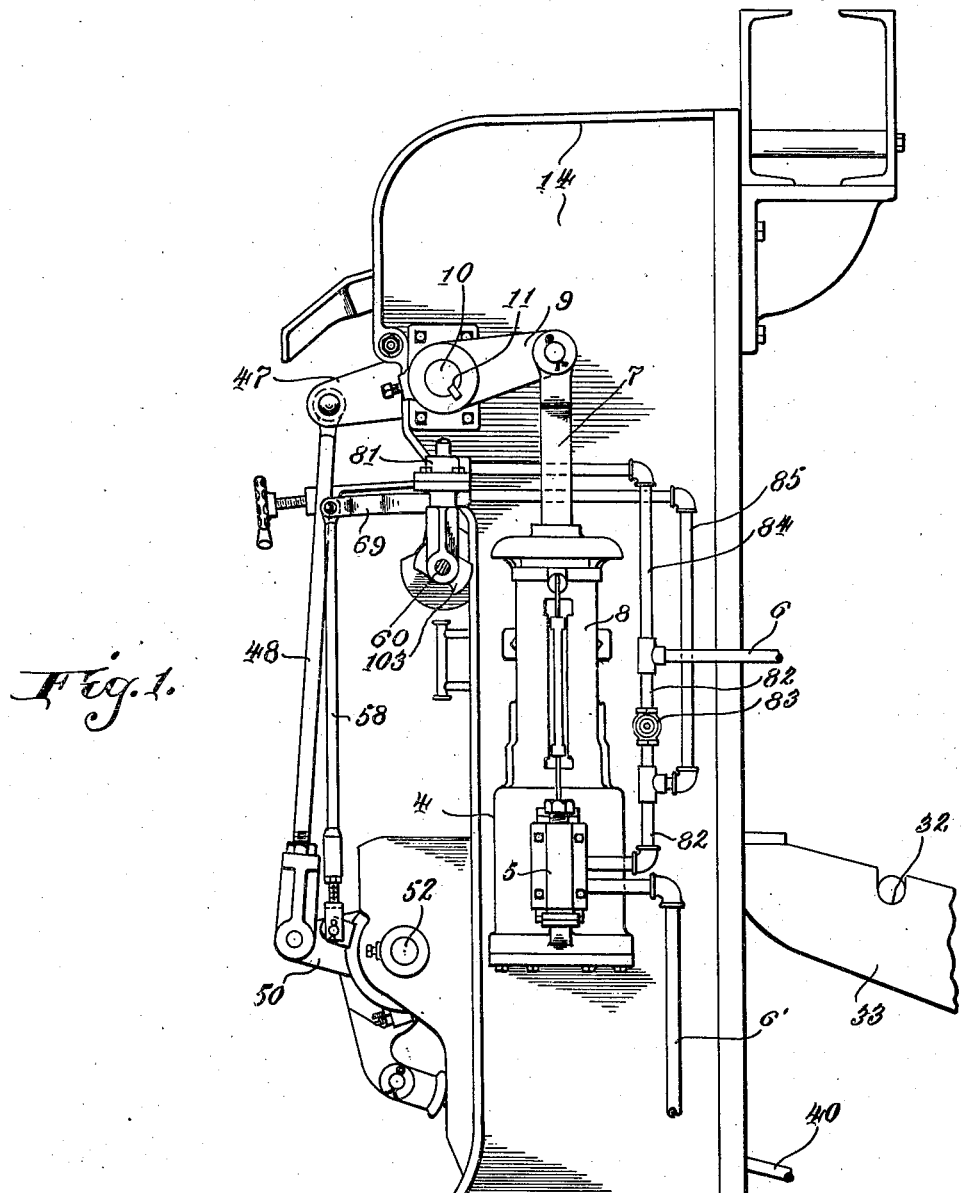
Figure 1 is a side elevation of the control assembly and the furnace front, the side wall of the furnace being removed to show a fragment of one of the stoker or stoking grate side bars and also of a pull rod.

Referring to the drawings by numerals, each of which is used to indicate the same or similar parts in the different figures, the construction shown includes a furnace front 1, Figures 1 and 2, with fire doors 2 and ashpit doors 3. At the side of the furnace front casing, the drawings show a reciprocating motor 4, which is preferably of a low speed type, being to the best advantage operated by fluid under pressure and therefore referred to herein as a hydraulic motor. With the apparatus shown the ordinary water supply pressure may be utilized, this or other hydraulic fluid being led to the valve chamber 5 by way of a pressure supply pipe 6 from any convenient source. The connecting rod 7 in the form of the invention shown is reciprocated by a cross head not shown connected to the piston of the motor and mounted in a suitable guide 8. Connecting rod 7 is pivotally connected at its upper end to the actuating arm 9 of a rocker shaft 10 to which it is connected by means of a key 11 or in any other suitable manner to operate the shaft 10. The rocker shaft 10 is utilized in the construction shown to operate a fuel pusher or feed 12 below the hopper 14 whereby the fuel is pushed forwardly from the coking shelf or otherwise deposited on the front of the stoking grate as best shown in Huber Patent No. 1,845,415, the details of this feed not being a feature of the invention and its presence in this relation not being essential to the operation of the invention. The fuel pusher 12 is connected to the rocker shaft 10 to be operated thereby by means of a depending arm 15 to the lower end of which the pusher 16 is connected by an adjustable link 16.

The drawings also illustrate furnace walls 25, Figure 3, of any suitable masonry or other construction extending rearwardly from the furnace front 1. Mounted in the furnace is a rocking bar stoker consisting of two stoker units or grate sections 26 and 27, which in the form disclosed are closely similar and substantially identical in detail with the stoking grate illustrated in Huber Patent No. 1,845,415, that is, each grate section 26 and 27 comprises a series of transversely extending rocking stoker bars 28, each being pivoted at the rear at 29 at each end to swing about a transverse axis upwardly and backwardly toward the bridge wall. The grate bars are shown as closely related, the front of one to the rear of the next, it being understood that the details of the stoking units are not essential to the present invention. The forward surfaces of each grate bar, see Figure 6 at 30, are curved on an arc, concentric with the pivots 29 so that as the sets of alternate stoker grate bars swing upwardly, there is not sufficient opening between the bars to drop the fire. The bars are also shown as slotted in a fore and aft direction of the furnace at 31 and the pivots or journals 29 are supported in seats 32 in longiturinal side bars 33, Figures 1 and 3, which are inclined downwardly and to the rear assisting in the feed of the fuel from the front where it is introduced to the rear, the part not previously burned or previously discharged being dropped from the drop bar 34.

Each grate bar is provided with a depending actuating arm 35 by which it is operated, i. e., rocked upwardly and rearwardly from its normal flat position in the grate surface to feed, break and aerate the fuel. In the form of the invention shown the bars are divided into two sets of alternate bars indicated in unit 26 by A and C, respectively, and in unit 27 by B and D, the bars of one set in the unit 26 being each connected at 36 to the connecting rod 37 to be operated thereby, the bars of the other sets being similarly pivotally connected to grate bar connecting rods 38 to be operated thereby, the bars of each set being operated simultaneously and the bars of the respective sets being operated, i. e., swung upwardly and backwardly successively, sets of each unit moving alternately whereby the fuel bed is broken and aerated, the ashes dropped and the burning fuel is moved backwardly with a step by step motion from the point of feeding at the front at 39 in Figure 3 to the rear where the remaining unburned material as clinker and ash, except that dropped between the grate bars during stoking, is deposited on the drop bar 34.

In order to actuate the two sets of bars composing each unit, the sets being operated successively or alternately, the connecting rods 37, 38 and the connecting rods of all the sets of bars composing the units of the series of units of which each plant is composed are connected, each set to a pull rod 40, which is operated by the pull rod actuating mechanism 41, see Figure 6. Accordingly there is such an actuating mechanism 41 for each set of rocking bars.

Figure 18:
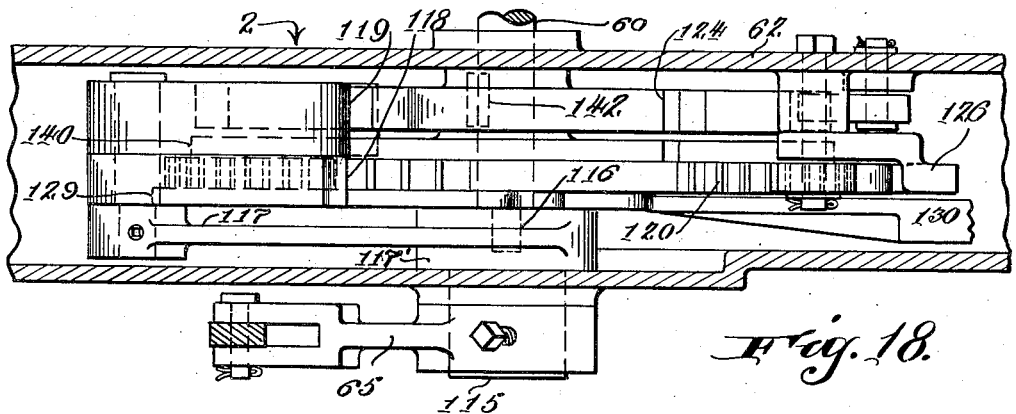
Figure 18 is a top plan view of the timing mechanism, the casing being broken away and shown in section and the connecting rod being likewise sectioned on line 18, 18 in Figure 11.
Figure 17:
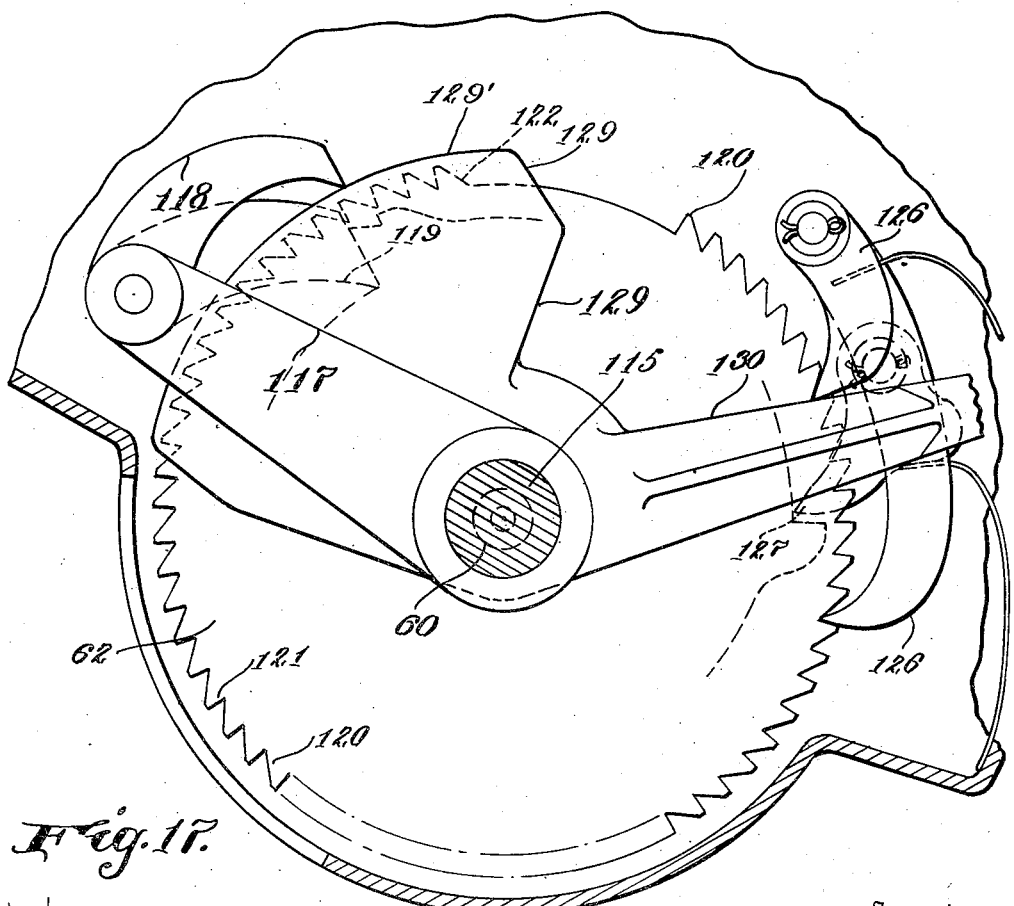
Figure 17 is a view looking from the left in Figure 2 at the time control mechanism, the housing being broken away and the actuating arm removed to show the ratchets and pawls.

As shown, the rocker shaft 10 carries secured thereto a forwardly projecting rocker arm 47 to the forward end of which is pivotally connected a depending actuating connection rod 48 and this connecting rod is in turn pivotally connected at its lower end at 49 to the actuating arm 50 of a pawl carrier 51, mounted to rotate freely on a short pull rod shaft 52, there being one such shaft for each mechanism 41. The pawl carrier 51 is provided with a radially projecting pawl arm 53 on which is pivotally mounted a double pawl 54 having a guiding member 55 and a pawl member proper 56. The shaft 52 also carries loosely mounted thereon a pawl shield 57 engaged by the guiding member 55. This shield 57 is controlled by a timing connecting rod 58 operated by a timing follower arm 69 to which it is pivotally connected at its outer end. This arm 69 is operated in any suitable manner. As shown, it is dropped at intervals by one of a series of differently timed cams 59 mounted on and operated by and rigidly secured to the timing shaft 60. These cams have their operative surfaces 75 spaced about the shaft at different angles as hereinafter described so as to positively time the pull rod actuating mechanism 41 for each pull rod so that the respective sets of stoker bars or grate bars are operated successively in predetermined relation without possibility of derangement of the timing. This timing shaft 60 in the form of the invention shown is operated by a mechanical timing mechanism 62, Figure 11, to be described on a later page of this specification in detail. The timing mechanism 62 is operated from the rocker shaft 10 by means of a timer shaft actuating arm 63 secured to said shaft 10 and connecting rod 64 connected to the outer end of the arm 63 and to the outer end of an arm 65 secured to the short shaft 115 of the timing mechanism 62 as shown in Figure 18. To return to the actuating mechanism:

The shaft 52 also carries mounted thereon an oscillatory pull rod arm member 66. This pull rod arm member is provided with a radially projecting pull rod actuating tooth 67, in the path of the engaging member 56 of the pawl 54 and adapted to be engaged thereby on the working stroke, i. e., the pawl is rocked to the left from the position in which it is shown in Figure 6 and returned to the right engaging the tooth 67 when it moves to the right, the shield 57 being first removed. The shield has a circular portion 57' of sufficient radius to support the pawl 54 by its guide member 55 out of contact with the tooth 67 and a depressed portion 68 which when opposite the tooth permits the pawl to engage. The pawl carrier 51 with the pawl 54 is rocked continuously about the shaft 52 by the operation of the rocker shaft 10 and rocker arm 47 and the connecting rod 48. At the proper periods determined by the angular relation of the cams 59 to the shaft 60 and the timing of said shaft 60 as hereinafter described, which shaft moves in a predetermined relation to the motor, a timing rod 58 is lowered and a shield 57 is moved in left handed rotation, as seen in Figure 6, uncovering the tooth 67 and permitting the engaging member 56 of the pawl 54 to engage the tooth 67 of the pull rod arm member 66. Immediately following this operation the reciprocation of the pawl 54 from the rocker shaft 10 and from the motor positively operates and draws forward the corresponding pull rod 40, it being understood that there is a pull rod actuating unit 41 for each pull rod 40, and each set of stoker bars A, B, C and D actuated by each corresponding stoker bar connecting rod 37 and 38, etc. Of these connecting rods there are two for each unit of grate area 26, 27, etc., there being one pull rod for each set of bars, the two sets composing each area being as aforesaid operated separately and in turn, i. e., alternately, all sets being operated successively. On the return stroke of the pawl carrier 51, due to the reciprocating action of the shaft 10 and connecting rod 48, the return dog 72 which projects from the member 51 into the path of the corresponding lug 73 on the pull rod arm member engages the same and returns the pull rod member to initial position and also the pull rod 40 to its initial position in which the top surfaces of the corresponding stoker bars lie flat in the grate surface. Thus when each set of bars is actuated the bars of that set are immediately returned to their position in the grate surface, avoiding any possibility of the bars dwelling in the fire and consequent burning. This is an important element in the operation of such stokers, dwelling of the bars in the fire resulting in destruction of bars after a very short period of use.

As already pointed out, the power plant to be operated by the time control and operating mechanism of the invention consists of an indefinite number of grate areas or stoker units 26, 27, etc., containing a corresponding number of sets of grate bars or rocking stoker bars which it is the purpose of the invention to operate successively in definite timed relation without variation from the intended sequence. To this end the timing shaft 60 which is operated in a predetermined timed relation from the rocker shaft 10 by the mechanical timing gear 62 carries a number of separate timing cams 59A, 59B, 59C, 59D, Figures 12 to 16, each of which is secured to the shaft 60 in fixed relation thereto as by keys 60', the cams having actuating faces 75A, 75B, 75C, 75D, shown in the form of depressions, in predetermined angular relation to each other, one for each pull rod 40, the number of actuating faces 75 being equal to the number of pull rods and to the number of sets of stoker members.

Figures 13, 14, 15, 16 show the cams 59A, 59C, 59B and 59D taken successively from left to right in accordance with their arrangement on the shaft 60. As shown in these figures, i. e., as seen from the right, the shaft 60 and cams turn contraclockwise, i. e. in left handed rotation dropping rollers 80A, 80B, 80C and 80D in the order named. Assuming the cam 59A which times the operation of the first set of stoker bars A of the first stoker unit 26 brings its actuating portion 75A opposite the follower roller 80A, the corresponding timing rod 58, of which there are four in the present installation, being thus dropped, moves the shield 57 to the left in Figure 6, permitting the pawl 55 to engage the tooth 67 whereby the corresponding pull rod and the corresponding set of grate bars is operated by the pawl and pull rod, and thence returned to normal position by contact of the dog 72, or more particularly the adjustable screw 72' thereof with the lug 73, as already described, the pawl shield 57 being thereafter immediately returned to the position shown in Figure 6 by the passage of the depressed actuating face 75A beyond the roller 80. Immediately thereafter the cams 59 being all secured to the shaft 60 in the angular relation shown in Figures 12, 13, 14, 15, 16, the actuating portion 75B of the cam 59B comes opposite the roller 80B. This cam times the operation of the first set of stoker bars B in the second stoker unit or grate area 27 which are operated and returned to normal position by the return motion of carrier 51 as the operative portion of cam 59B shown in the form of the depression 75B passes beyond the roller 80B. As the shaft 60 with the cams 59 thereon continues to rotate after a predetermined adjustable dwell, the actuating surface 75C of the cam 59C drops the roller 80C, causing the second set of stoker bars or other stoker members C of the first grate section 26 at the left to be operated. These bars are then immediately returned to normal position by the operation of the dog 72 and the lug 73, the shield 57 being returned to the position shown in Figure 6.

The operation of the second set of stoker bars of the second section 27 is then initiated by the timing cam 59D after the manner described in connection with the other cams and the other sets of stoker bars, it being understood that any convenient number of stoker units may be thus controlled, including any corresponding number of sets of stoker members or stoker bars, the sets being indicated by reference characters A, B, C and D in Figures 3 and 6, and the individual stoker bars by reference character 28, there being an adjustable dwell between operations.

Figure 11:
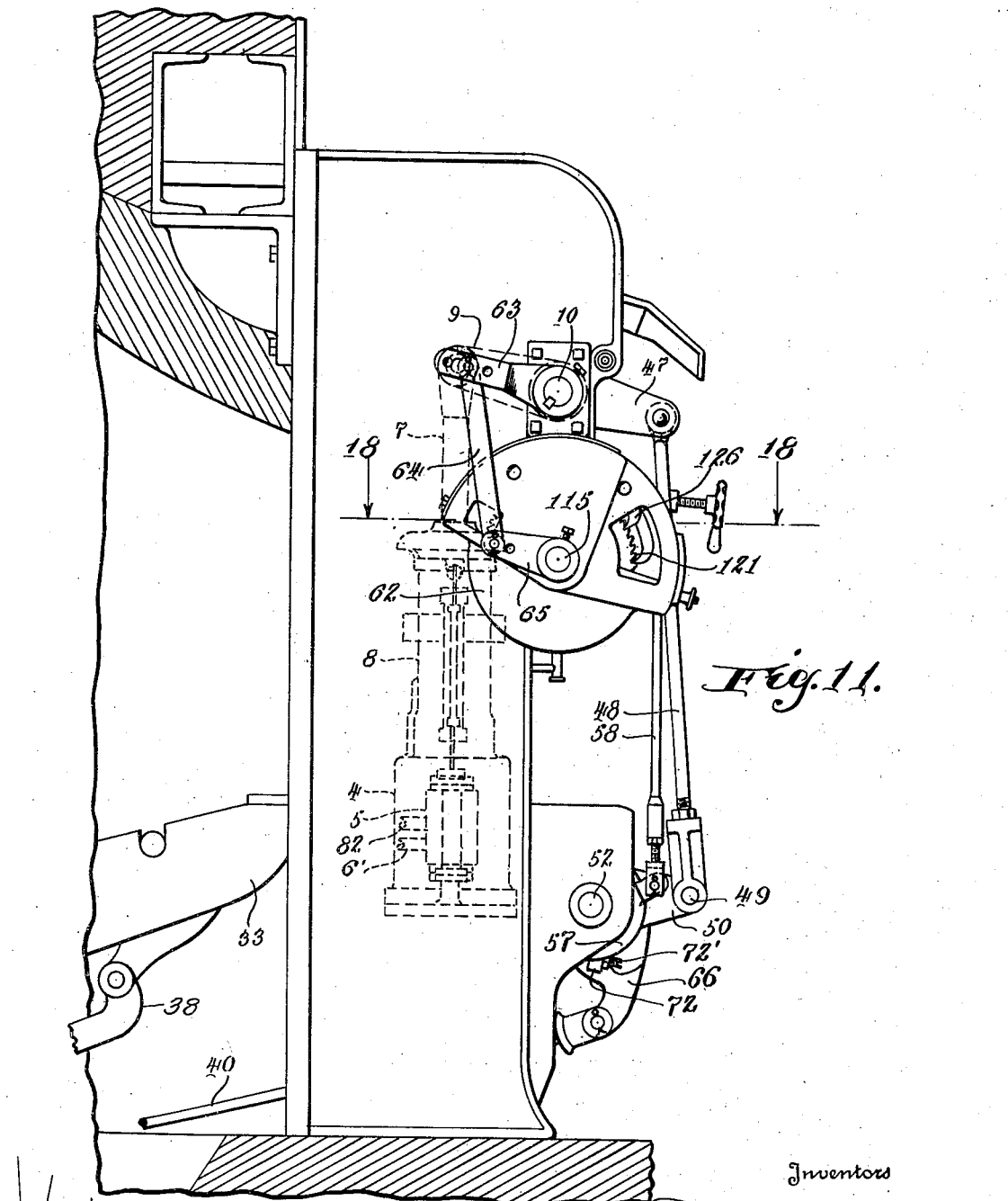
Figure 11 is an elevation of the timing mechanism looking from the left in Figure 2.

Figures 2 and 11 show the timing mechanism 62 for shaft 60 in a general way in its relation to the rocker shaft 10, timing shaft 60 and the pull bar actuating mechanism 41. The arm 65 which is secured to a stub shaft 115 centered with the shaft 60, Figure 18, by pin 116 receives an oscillatory motion about the axes of shafts 60 and 115 from the connecting rod 64, and the arm 63 which is secured to the rocker shaft 10. The stub shaft 115 is shown as formed integrally with the hub 117' of a pawl arm 117 which carries pivoted to its outer end two pawls 118 and 119, see Figures 17, 18, 19, 22 and 23. The pawl 118 operates a ratchet wheel 120 referred to herein as the shield ratchet wheel because it has attached to it shield 140 hereinafter described. The operation of this shield is the principal function of said ratchet wheel. This ratchet wheel has relatively small teeth 121 on its periphery extending around the entire periphery of the ratchet wheel except for the space 122 equal to about seven teeth. The pawl 119 operatively engages and operates the heavy duty ratchet wheel 124 having teeth disposed in the same direction as are the teeth 121. These teeth are, however, spaced apart by a relatively considerable arc, the ratchet wheel 124 having six teeth equally spaced about its entire periphery, see Figure 19. The spacing of these teeth and the number thereof has a bearing on the timing of the shaft 60 and the pull rods, the invention not being limited to or dependent upon the details which are subject to variation or the particular relation between the teeth of the respective ratchet wheels. Shield ratchet wheel 120 gives a continual step by step motion with intervals due to the action of its shield 129. In the construction illustrated the teeth of the heavy duty ratchet wheel 124 are spaced by arcs of 60 degrees. Backward motion of the shield ratchet wheel 120 is prevented by the double locking pawls 126 engaging the shield ratchet wheel 120 and backward motion of the heavy duty ratchet wheel 124 is prevented by locking pawl 127.

Figure 20:
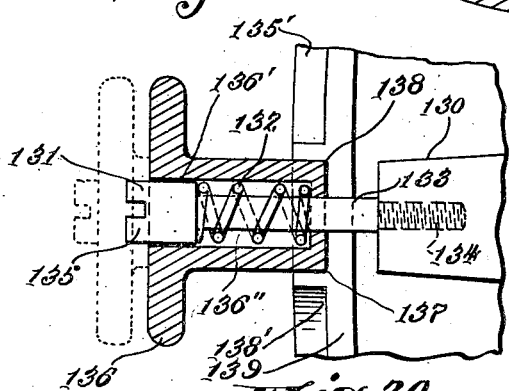
Figure 20 is a fragmentary view in a radial plane of the axis indicated by 20, 20 in Figure 2 showing the pawl adjustment for the timing ratchet.
Figure 10:
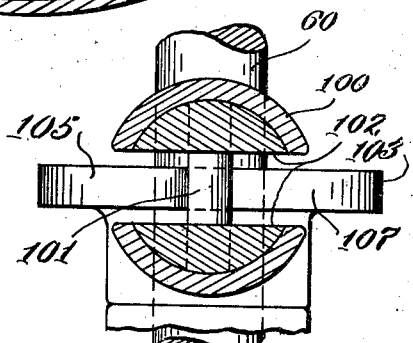
Figure 10 is a fragmentary sectional view taken on the line 10, 10 of Figure 12, looking in the direction of the arrows.

The operation of pawl 118 in connection with the shield ratchet wheel 120, i. e., the periods of step by step motion is controlled by a shield 129 mounted to move freely about the shaft 60. This shield member 129 is held in adjusted position in the form of the invention shown by the adjusting arm 130 which carries at its outer end a simple latch 131, Figure 20, consisting of a coil spring 132 coiled about a pin 133 seated in the end of the arm 130 and projecting outwardly therefrom, the pin 133 being adjustable in the arm 130 by means of the thread 134. The forward end of the pin or stud 133 is provided with a slotted head 135 located in the open end of a central bore 136' in a handle and boss 136 in which boss the spring 132 and the outer end of the pin or stud 133 are located. The outer periphery of the casing at 135' is provided with adjusting seats or depressions 138 arranged in a line along the periphery of the casing 139. The spring 132 bears at one end against the enlarged head 135 of stud 133 and at the other end against the bottom of bore 136' which is closed.

To adjust the shield 129 which may be distinguished by the term "adjustable shield", the handle or hand grip 136 is drawn outwardly against the tension of the spring 132, the end of the hub 137 being withdrawn from the socket 138 which is one of a series of sockets provided for this purpose and arranged along the periphery of the casing 139. By withdrawing the hub 137 from the socket 138 against the tension of the spring 132, the arm 130 with the shield 129 thereon may be moved into alignment with another of the sockets 138, 138', being thus moved to any desired position of adjustment conforming to the position of the sockets 138, 138', the boss being dropped into the proper socket to get the desired adjustment holding arm 130 stationary.

Figure 19:
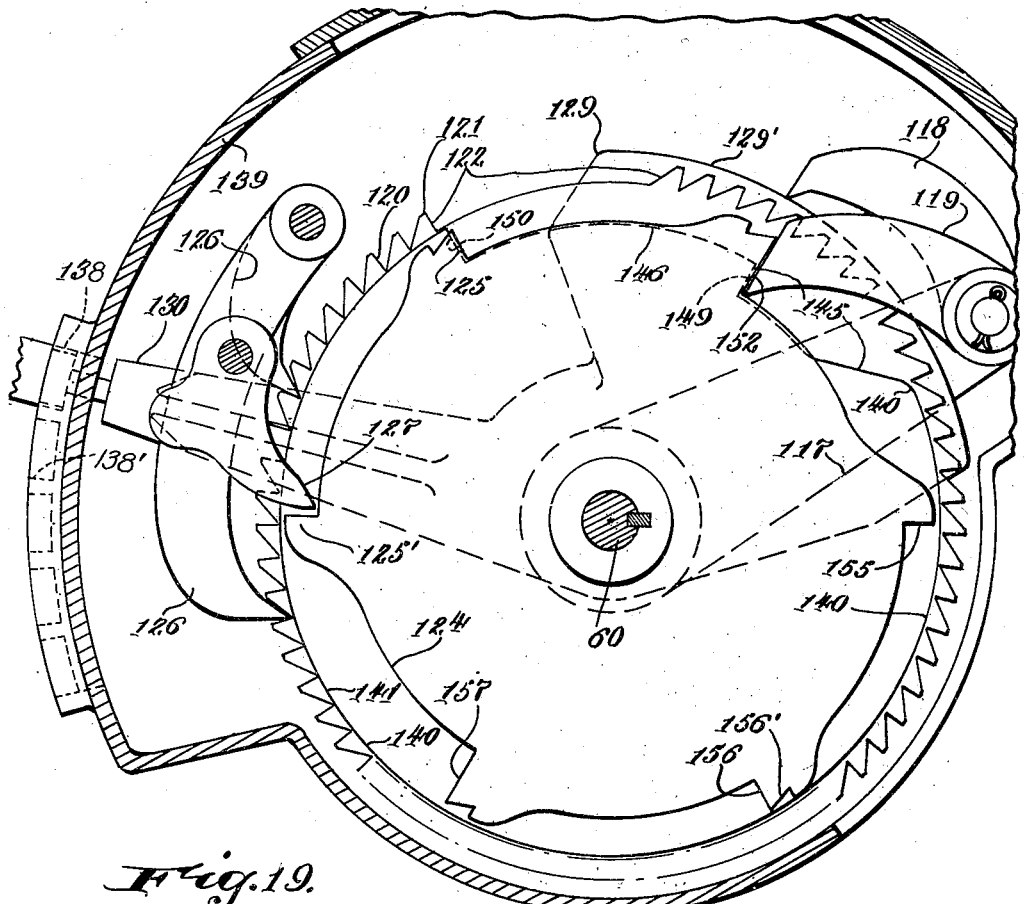
Figure 19 is a view looking at the timing mechanism from the right in Figure 2, the housing being sectioned and broken away to show the ratchet and pawls.

In this way the operative area or effective throw of the pawl 118 is increased or reduced as shown in Figure 19, the greater the length of the shield surface 129' in front of the pawl in its retracted position; i. e., to the left in Figure 22, the less the length of the effective stroke of the pawl, i. e. by advancing the shield 129 to the left in Figure 19, the length of the stroke of the pawl during which it is permitted to engage is decreased.

The operation of heavy duty ratchet wheel 124, or more properly, the operation of the pawl 119 which actuates the ratchet wheel is directly controlled by a heavy duty pawl shield 140, see Figures 18 and 19 and Figure 21, in which latter figure this shield 140 is shown to be directly attached to the shield ratchet wheel 120. The shield 140 is of peculiar construction having a circular peripheral surface concentric with the shaft 60 on which the shield is mounted, both the shield ratchet wheel 120 and shield 129 being free to rotate relatively to the shaft. The heavy duty ratchet wheel 124 is on the contrary secured to the shaft 60 to drive the same, being held in its relation thereto by a key 142. The shield 140 has a circular pawl supporting surface 141, as already pointed out, on which the pawl 119 rides free of the heavy duty ratchet wheel 124 excepting for an arc shown of about 100 degrees at the top in Figure 21 within which the pawl 119 is permitted to engage the teeth of the heavy duty ratchet wheel 124 in a manner to be described. This arc indicated by reference character 144 in Figure 21 includes a short and relatively deep depression 145 at the right hand end portion of the arc 144 and a lesser depression 146 extending forwardly from the tooth 149 at the forward end of deep depressed portion 145 to the opposite or forward end of the arc 144. Both the deeply depressed arc 145 and the relatively shallow depression 146 are shown as provided with circular depressed pawl supporting paths 147, 148, respectively, there being a radial surface at 149 between said arcuate paths. The radial surface at 149 provides a tooth for the pawl shield 140, which is engaged at the proper time by the pawl 119 to rotate the shield 140 and the shield ratchet wheel 120 secured thereto and the rotation is accomplished by means of the pawl 119, which normally engages the heavy duty ratchet wheel 124, such rotation being accomplished independently of the pawl 118 which normally actuates the ratchet wheel 120 as hereinafter described. The radial surface 150 of the shield 140 at the forward left hand end of the shallow path 148 also acts as a tooth whereby the pawl 119 moves the shield 140 together with the small toothed shield ratchet wheel 120 in the first step of the heavy duty ratchet operation.

In the operation of the timing gear the pawl arm 117 with the pawls 118, 119 being oscillated continuously from rock shaft 10 by the arm 63, connecting rod 64 and arm 65, shown in Figure 11, the shield ratchet wheel 120 is rotated slowly with a step by step motion, the speed and the length of the steps depending upon the position of the shield 129 as determined by the adjustment of the shield, the arm 130 being locked by the fastening 137, 138, with the shield surface 129' in corresponding position. As already pointed out, the further this shield is advanced to the left in Figure 19 beyond the retracted position of the pawl 119, the shorter is each step of the step by step motion of heavy duty pawl shield 140 moved by shield ratchet wheel 120, and the slower the speed of the stoking mechanism.

Figures 13, 14, 15, 16:
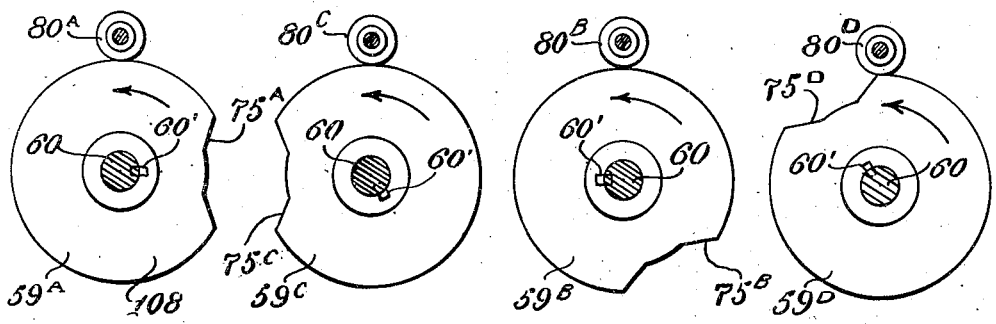
Figures 13, 14, 15 and 16 are elevations of the respective timing cams in their respective relative positions.

It being recalled that the shield 140 is carried by the ratchet wheel 120, when the forward shield tooth 150 of the shield 140 reaches the position illustrated in Figure 22 showing the end of the backward stroke of pawl 119, it being also understood that all of this mechanism rotates forwardly counter clockwise as seen in Figures 19, 21, 22, 23, the pawl 119 drops behind the tooth surface 150 of the shield 140 and tooth 125' of ratchet wheel 124 in the retracted position of the pawl, and as it advances it engages both tooth 150 of the shield 140 and the tooth 125' of the heavy duty ratchet wheel 124 secured to shaft 60 moving the shield and ratchet wheel 124 in left handed rotation thereby rotating shaft 60 to a position in which the roller 80A drops into notch 75A of the cam 59A whereby an actuating mechanism 41 is caused to pull rod 40, operating the first set of stoker bars A of the first unit 26, as described in connection with Figure 13 and Figure 6.

The shield 140 and heavy duty ratchet wheel 124 and the shield ratchet wheel 120 are thus moved by the pawl 119 to the position in which they are shown in Figure 23. In this position the blank space 122 of the ratchet wheel 120 has moved into the path of the pawl 118, the teeth 121 of the ratchet wheel 120 which would otherwise be in the path of the pawl 118 being protected by the adjustable shield 129 so that the pawl 118 does not engage the ratchet wheel 120, and this ratchet wheel remains stationary during the remainder of this period of stoker operation except as it is further moved by pawl 119 engaging shield 140. On the next forward stroke of the pawls the pawl 119 engages the tooth 125 of the ratchet wheel 124, the tooth 149 of the heavy duty pawl shield 140 being protected from the pawl 119 which is held out of contact therewith by the surface 151 of the ratchet wheel 124 at the bottom of the tooth 125. Engagement of tooth 125 by the pawl 119 moves the ratchet wheel 124 and the shaft 60 independently of the shield ratchet wheel 120 which remains stationary holding shield 140 also stationary and cam 59B drops its follower, operating the corresponding stoker pull rod mechanism 41B to pull the rod corresponding to the first or set of stoker bars B in section 27 as described in connection with Figure 13, operating this set of stoker bars which are immediately returned by the mechanism 41 to their normal position in the grate surface.

The operation of the heavy duty ratchet wheel 124 as just described, independently of the shield 140, the ratchet wheel 120 and the shield 129 with the space 122 keeping the ratchet wheel 120 from being engaged by pawl 118, brings the parts to the position shown in Figure 19 in which the pawl 119 engages the deep tooth 152 of the ratchet wheel 124, there being two deep teeth 152 and 157 diametrically opposite, as illustrated in Figure 19. On the next stroke of the pawls the pawl 119 engages both the tooth 152 of the heavy duty ratchet wheel 124 and the deep tooth 149 of the shield 140 whereby the shield 140 is moved to the position in which it holds pawl 119 out of engagement and the ratchet wheel 120 being similarly moved, the spacer 122 which has prevented operation of the ratchet wheel 120 by the pawl 118 is moved out of the path of the pawl 118 permitting the pawl 118 to engage on the next stroke. This motion of the shield 140 brings the circular surface 141 of said shield into a position in which it prevents re-engagement of the pawl 119.

The timing cams 59A, 59C, 59B and 59D, Figures 13, 14, 15 and 16, correspond to and with the respective sets of grate bars "A", "C", "B" and "D", controlled thereby. The first step of the ratchet wheel 124 from the position, Figure 22 to the position, Figure 23, causes the roller 80A to drop into the notch 75A of the cam 59A whereby the actuating mechanism 41, Figure 6, is caused to pull the rod 40, Figure 3, rocking the set of stoker bars A upwardly and backwardly into the fire with the effect previously described in connection with the rocking of these bars, i. e., the fuel bed is moved backwardly, broken and aerated, the clinkers are broken and the ashes dropped, etc.

The second step of the ratchet wheel 124 from the position, Figure 23, to the position, Figure 19, causes the roller 80B to drop into the notch 75B of the cam 59B whereby the first set of stoker bars B in section 27 set are rocked upwardly and backwardly toward the bridge wall with the effect upon the fuel bed already described. The third stroke of the ratchet wheel 124 from the position, Figure 19, to the position in which the tooth 152 is advanced to the position occupied in Figure 19 by the tooth 150, the cam 59B is so moved that the follower 80B is passed out of the depression 75B, all of the rollers 80 bearing on the circular raised portion 108 of cams 59 (see Figure 12) so that the stoker bars are quiescent until the second set of teeth of the ratchet wheel 124 come into operation operating bars C and D which takes place when ratchet wheel 120 turns shield 140 to the position it occupies in Figure 22. This is a variable period determined by adjustment of shield 129. The teeth of the second set on ratchet wheel 124 are indicated by reference characters 155, 156 and 157, the latter being the deep tooth corresponding to tooth 152. It will be understood that the dwell of each cam 59A, 59B, 59C and 59D with the respective followers in the depressions thereof is only sufficient for a single operation of the corresponding set of stoker bars, it being further understood that each set of stoker bars after being rocked is immediately returned to its position in the surface of the stoker or grate by the action of the dog 72 against the lug 73 so that if the dwell were longer it would merely result in a second rocking of the same set of stoker bars. The double teeth as at 156' are indicated and may be provided to avoid failure in case the pawl misses or passes the corresponding main tooth.

As a means for turning the timing shaft 60 by hand we have shown a capstan wheel 185 secured to the shaft at the right hand end, said wheel being provided in the form shown with a plurality of radial sockets 186 in which a bar may be inserted to provide sufficient leverage for this purpose. Because of the provision of locking pawls 126, 127, the timing shaft can only be turned forwardly. As the turning of the time shaft serves to operate the booster valve 81, the entire stoker may be moved in this way even when the throttle valve 83 is closed and can not be left with any set of bars in the fire.

Figure 12:
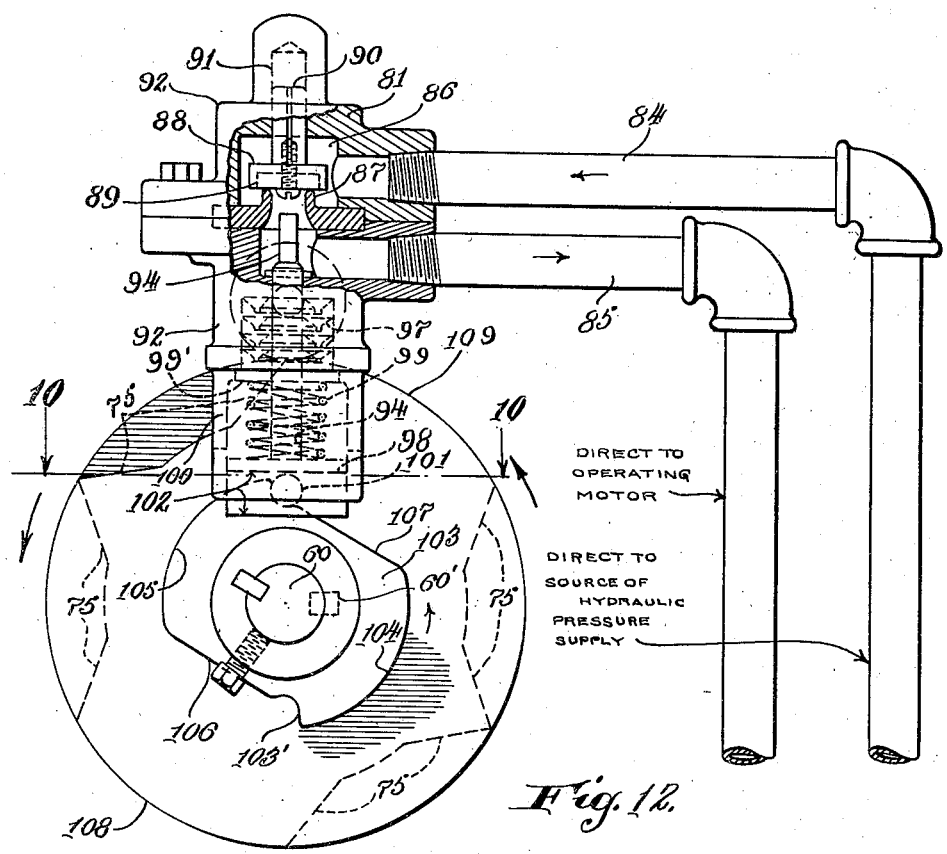
Figure 12 is an elevation of the excess power or booster valve, portions of the valve casing being broken away to show the valve casing in central section, the view also including the valve cam, and the timing cams which are on the same shaft are shown diagrammatically in their relation to each other.

For the purposes described the apparatus includes a booster valve 81, see Figure 12, connected to the motor 4 in a manner to be described, it being understood that the motor 4 is preferably a hydraulic motor, though other types of fluid motor may be substituted.

Referring to Figure 1, hydraulic fluid under pressure is supplied by way of a pipe 6 from any suitable source, the discharge being accomplished by way of a pipe 6'. This fluid pressure supply pipe 6 is connected to the intake side of the valve chamber 5 of the motor 4 by a pipe 82 containing a throttle valve 83 for determining the normal supply of fluid to the motor and the normal speed of the motor between the operations of the sets of stoker bars or members. The only load on the motor between these operations of the bars is that incident to running the timing gear. The supply pipe 6 is also connected to the booster valve 81 by a pipe 84 and the booster valve 81 is connected to the motor valve chamber 5 by a pipe 85 which in the form shown is connected to the pipe 82 between the throttle valve 83 and the motor valve chamber 5. In other words, the booster valve 81 is in a bypass whereby the motor fluid is bypassed from the supply 6 around the throttle valve 83 to the valve chamber 5 and to the motor at periods determined by the operation of the valve 81 which is normally closed. The booster valve 81 in the form shown may be defined as a check valve in the bypass 84, 85 opening oppositely to the flow of fluid from the supply so that it is normally closed by the fluid pressure, being open by suitable timing mechanism properly timed with the operation of the stoker, said timing mechanism being in the form of the invention shown operated by the timing shaft 60.

More specifically described the booster valve 81 and the operating mechanism therefor is as follows:

The valve 81 comprises a chamber 86 connected to the pipe 84 of the bypass which is in turn connected directly to the supply pipe 6 on the pressure side of the throttle valve 83. This chamber contains a valve seat 87 which is shown is raised projecting upwardly into the chamber, i. e., toward the pressure supply. Cooperating with this seat 87 is a freely moving disk valve 88 which preferably contains a packing disk 89 which is interchangeable and secured in any suitable manner. The valve disk 88 as shown is guided by a pin 90 which operates in a hole or guideway 91 drilled upwardly into the valve casing 92. The valve is lifted by an unseating pin 94 and the casing 92 is also provided with a suitable packing gland 97 with packing therein surrounding the pin 94 which projects downwardly through the packing. The lower end of the pin 94 carries a disk 98 secured thereto and serving as an abutment for a coil spring 99 which encircles the lower end of the pin between the moving abutment or disk 98 and a fixed abutment 99' at the top shown in the form of a washer which covers the lower side of the packing gland 97 or is otherwise seated in the top of the spring housing 100 which surrounds the lower end of the valve unseating pin 94. The abutment disk 98 also carries a follower roller 101 mounted transversely of a slot 102 in the disk or moving abutment 98 which slot is entered by the valve cam. This follower roller 101 is engaged by the valve cam 103 on the shaft 60 which cam moves contraclockwise as shown in Figures 1 and 12. This cam has circular high paths 104 and 105 concentric with the axes of the shaft 60. When the cam roller 101 engages these high paths 104, 105, the pin 94 is raised, the spring 99 being compressed and the booster valve 81 is held open, the disk 88 being elevated so that an excess supply of fluid under pressure is passed to the motor through the booster valve and the bypass 84, 85 around the throttle 83. The cam also has low paths 106, 107 between these two high paths 104, 105 on each side, which permit the spring 99 to expand lowering the pin 94 and permitting the valve 81 to close, the valve disk 88 being returned to the seat 87 by the fluid pressure in and through the pipe 84 and in chamber 86. The cam 103 has a radial drop at 103' to give quick closing, and this cutout 103' forms a seat to prevent torque in the timing shaft.

It is of particular interest that the high paths 104, 105 are radially opposite the actuating depressions 75 or other actuating faces of the cams 59A, 59B, 59C and 59D, which are secured to the shaft 60 to which the valve cam 103 is also secured, so that whenever the pull rods 58 are advanced, in the present instance being depressed, the valve is open, admitting a supply of fluid which has been referred to as an excess supply of fluid, to the motor by way of the bypass 84, 85 and valve 81. This makes it impossible to stop the motor by closing the throttle until the actuating surfaces 75 have passed their followers 80A, 80B, 80C, 80D, which are in the same radial plane of shaft 60 with the follower 101. The low paths 106, 107 of valve cam 103 are opposite the arcs 108, 109 which are common nonoperative surfaces of the cams 59A, 59B, 59C and 59D, i. e., nonoperative surfaces which are in line with each other in the direction of the axis and representing periods of rotation of the shaft 60 during which the stoker mechanism is inoperative, the bars dwelling in their normal position with their top surfaces in line with the grate surface at the time the booster valve is closed and the boosting operation discontinued.

It is thus not only wholly impossible to stop the stoker with any set of bars elevated, but the valve also serves, as already pointed out, to supply an excess of fluid under pressure to the motor during the periods of stoker operation when the pull bars 40 are pulled and returned, giving a quicker and more definite operation of the sets of stoker bars and making it feasible to operate the motor between stoking operations with a small supply of fluid giving the greatest possible economy. While this is the preferred form, other types of fluid pressure booster may be employed.

In accordance with the preferred embodiment of the invention there is a pull rod 40 for each set of stoker members and an actuating mechanism 41 for each pull rod. The actuating mechanisms 41 are operated through the rocker or rocker shaft 10 or in any suitable manner from and by the motor for which other types of motor may be substituted, the fluid pressure motor being preferred. For convenience and preferably, though variation of the arrangement is possible, the timing shaft 60 is operated from the same stoker motor by way of the rocker shaft 10 and the timing gear 62 which imparts to the shaft 60 a step by step motion in a plurality of series of steps, the steps of each series corresponding to the number of units, there being in this instance three steps in each series. The cam shaft 60 makes a complete revolution in six steps. The first two of these causing one set of alternate grate bars in each grate section to be successively operated, while the fourth and fifth steps likewise cause the remaining sets of alternate grate bars in the respective sections to be operated in order. Steps three and six provide for a pause in the grate action after the operation of one set of grate bars in each section for a period equal to the time required to operate the shaft 60 through a one-sixth revolution. Each time a roller 80 drops into a depression 75, there is a single complete motion of the corresponding actuating mechanism 41 with a pull of the pull rod which rocks the corresponding set of bars and then returns it to its position in the grate surface. The plain surfaces 108, 109 which as shown in Figure 12 are common to all the cams 59A, 59B, 59C, 59D, and the dwell of timing gear 62 which corresponds to the operation of cams 59, pawl 119 being on dwell surface 141 when all of rollers 80 are on surfaces 108 or 109 provide a dwell between the respective series of steps and between stoking operations in which all the sets of stoker bars are quiescent in normal position in the grate surface. By adjustment of the arm 130, Figures 19 and 20, the speed of the timing mechanism may be adjusted to give any suitable dwell between stoker operations without changing the speed of the rocking and return movement of the sets of stoker bars which is independent of the timing mechanism, being communicated through actuating mechanism 41 direct from the rocker 10 and the motor 4.

In the operation of such apparatus it is a prime necessity that there should be no possibility of stoppage with the stoker bars in the position in which they have been rocked upwardly into the fuel bed. Such a stoppage of the stoker would result in burning and probable destruction of the bars. It is also of primary importance that the timing mechanism be so arranged that there is no possibility of derangement or sticking which would tend to throw the separate sets of stoker bars out of time and cause two or more sets to be operated simultaneously as this results in a serious overload on the motor with the consequent retardation and the possibility of stopping and consequent burning of the bars. Also if such overload is a possibility, an excess of power sufficient to operate more than one set of units at a time must be provided with consequent loss of power. Also, derangement of the timing may cause simultaneous rocking of two sets of bars of the same unit which would result in dropping a considerable portion of the fire and consequent loss of economy.

To avoid these various possibilities, applicant has provided a separate actuating mechanism for each set of stoker bars and a separate timing unit controlling each set, the timing unit in the present instance consisting of a separate timing cam or other timing means for each set of stoker bars and each actuating unit with a separate control from the timing cam to the actuating unit, the timing cams or other timing means being rigidly mounted on a single timing shaft or timing member so that their definite relation is positively maintained. In this way applicant has produced a timing and actuating mechanism which is absolutely proof against any possibility of derangement and dependable under all circumstances to effect the actuation of the sets of stoker bars in the proper relation. As a further protection against the dwelling of the bars in the fire and consequent burning and as a means for economizing power in the normal operation of the motor between the successive operations of the sets of bars, applicant has provided a booster shown in the form of a valve and suitable connection which controls an excess supply of fluid under pressure to the motor, the booster valve 81 being operated from the timing mechanism so as to give an excess supply of fluid and an excess generation of power during the operation of each set of bars.

While the booster may be otherwise connected in order to avoid the possibility that the stoker may be stopped by closing the throttle valve in the supply of fluid under pressure to the motor, this valve has been placed in a bypass around the throttle valve so that in case the throttle valve is closed at any time a sufficient supply of fluid to the motor is provided through the booster valve to operate the stoker up to a point where the particular set of bars in operation is returned to its normal position, i. e., flat in the grate surface, none of the bars protruding into the fire. The booster valve is then closed by dropping of the cam roller 101 on one of the low surfaces 106, 107 of the cam 103 and this surface being opposite the common high surfaces 108, 109 of the cams 59A, etc., the throttle valve being closed, the motor fluid is cut off with the stoker bars in withdrawn position, i. e., in a position in which they are flat in the grate surface. The opening of throttle valve 83 is regulated so as to give the desired speed of the motor and timing gear between grate bar or stoker operations. The booster by providing increased power during each stoker operation gives a great economy of power with a quick and powerful operation of the stoker bars and absolute prevention of stoppage of the mechanism with any set of bars rocked upwardly into the fuel bed and greatly increased economy due to the fact that between strokes or stoking operations a minimum of motor fluid at a concurrent low pressure is employed. With this device a supply of water at ordinary service pressure may be employed.

The terms "forward" and "rear" as applied to the timing mechanism relate to the direction of rotation of the heavy duty ratchet wheel which, in this instance, is counter-clockwise as seen in Figure 23 and similar figures, "forward" being counter-clockwise and "rearward" being clockwise in the form disclosed.

We have thus described specifically and in detail a stoker timing and control mechanism embodying the features of our invention in the preferred form in order that the manner of constructing, applying, operating and using the same may be fully understood. However, the specific terms herein are used descriptively rather than in a limiting sense, the scope of the invention being defined in the claims.

What we claim as new and desire to secure by Letters Patent is:

1. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of a rocker shaft, means for operating the shaft at a substantially uniform regulatable speed, a timing shaft with timing mechanism for operating said timing shaft from the rocker shaft with a step by step motion, said steps being performed in a plurality of spaced series with a dwell interval between said series, said timing mechanism comprising a heavy duty rachet wheel secured to the timing shaft and a pawl engaging said ratchet wheel and providing the step by step motion of each series of steps, a shield for controlling said pawl, a shield, ratchet wheel and pawl mechanism for operating said shield, a pawl carrier for said pawls having an actuating connection to the rocker shaft, adjustable means for controlling the shield pawl, to vary the time of operation of said sets of stoker members, separate timing cams secured to said timing shaft one for each set of stoker members, a pull rod operating each set of stoker members, a separate actuating mechanism for each pull rod, each said actuating mechanism comprising a shield operated by the corresponding cam on the timing shaft, a pull rod pawl controlled by said latter shield, a pull rod arm member operated by said pawl, a connection to the rocker shaft including a pull rod pawl carrier for operating each pull rod pawl to apply tension to the pull rod to operate the corresponding series of stoker members, each said pawl carrier having means for returning the pull rod and the corresponding series of stoker members immediately to their respective normal positions on the return stroke of the pawl following each operation of the pull rod.

2. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of a rocker shaft, means for operating the same at substantially uniform speeds, a timing shaft with timing gear, means for transmitting motion from the rocker shaft to the timing gear and a connection from the latter to the timing shaft for operating said timing shaft from the rocker shaft with the timing gear, comprising means for producing separate series of closely related step by step motions, means for providing an interval between said series of steps and means for adjusting said interval, timing means on said timing shaft, one for each set of stoker members rigidly secured to the timing shaft, a pull rod connected to each set of stoker members, actuating mechanism for each pull rod, each said actuating mechanism comprising a pawl carrier and connections whereby it is positively actuated from the rocker shaft, a pawl on each carriage, a toothed pull rod actuating member connected to each pull rod and operated by said pawl, a pawl control for each pull rod actuating mechanism and connections whereby each said control is operated from the corresponding timing means on the timing shaft to permit the pawl to engage at periods determined by said timing means and coinciding with the steps of the timing mechanism to operate each pull rod in turn and means operated by the rocker shaft for immediately returning the pull rod and the stoker members of that set to normal position, all the sets of stoker members being quiescent in normal withdrawn position during said interval.

3. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of a power source for operating the same, a heavy duty ratchet wheel, a timing shaft operated thereby and timing means positively secured thereto one for each set of stoker members, said ratchet wheel having a plurality of sets of teeth, each set of teeth being adapted to give a corresponding set of steps, the sets being separated by intervals, each set of teeth comprising a deep tooth which is the rear tooth of said set, the ratchet wheel having a deep depression at the base of and to the rear of the deep tooth, a pawl shield, a pawl actuated from said power source for operating said heavy duty ratchet wheel and controlled by said shield, the pawl shield having a pawl supporting surface comprising a raised portion of greater radius than said heavy duty ratchet wheel teeth, said shield also having two teeth spaced similarly to the ratchet teeth said teeth being spaced by a relatively wide arc to give a step by step operation, the rearmost tooth of the shield being a deep tooth spaced inward radially from the said raised portion, the shield also having a depression which is located at the base and immediately to the rear of the deep tooth and a supplementary pawl-supporting surface extending forwardly from the top of the deep tooth which is depressed below the shield surface to the base of the forward tooth, the pawl being adapted to engage both the ratchet wheel teeth and the shield teeth, the forward tooth of the shield being engaged by the pawl simultaneously with its engagement of the forward ratchet tooth of each said set of heavy duty ratchet teeth, to move the shield forwardly to operating position for each series of steps and the deep tooth of the shield being engaged by the pawl simultaneously with its engagement with the deep tooth of the ratchet wheel to advance the shield and the ratchet simultaneously on the last stroke of each series, placing the shield in a position in which the said pawl is supported on said raised surface, preventing engagement of the pawl with the heavy duty ratchet wheel teeth, and a second ratchet wheel and pawl, said pawl being connected to said source of power, to be operated in time with said first-mentioned pawl, and said second ratchet wheel being connected to said pawl shield to move said shield between the respective sets of steps from one operative position to another whereby the interval between said series is determined, a separate actuating mechanism for and connected to each set of stoker members, each said actuating mechanism being connected to said power source to be continuously operated thereby and separate controlling means for each actuating mechanism connected to and operated from the corresponding timing means on the timing shaft.

4. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of a fluid pressure motor, actuating mechanism for each set operated by the fluid pressure motor and connected to the corresponding set of stoker bars, timing mechanism controlling said actuating mechanism whereby the sets are operated in turn with predetermined adjustable relatively long intervals between part of said operations, means for controlling the fluid pressure supply to the motor to reduce the power of the motor to the minimum capable of operating the timing mechanism and actuating mechanism, and for cutting off said power, a booster valve connected to a supply of fluid under pressure and to said motor to give an excess supply of fluid to the motor, said valve having means whereby it is operated from the timing mechanism and held open during the operation of each set of stoker bars and closed during said intervals between operations giving an increase of power and maintaining the desired speed of the motor during each operation and preventing stopping of the motor when any set of bars is in advanced position.

5. The combination with a stoking grate comprising a plurality of units, each unit consisting of a plurality of sets of stoker members which in their normal position present a fuel bed supporting surface and are mounted to move upwardly into said fuel bed from normal position and are provided with means connecting the members of each set together to move together, of timing and actuating mechanism for said sets comprising a source of power, a separate actuating mechanism for each set connected to the source of power to be driven thereby and connected to the corresponding set of stoker members to operate the same, means for immediately returning the stoker members of each set to normal retracted position from which they are advanced in the stoking operation, said timing mechanism being suitably connected to the source of power to be operated thereby, connections from the timing mechanism to each actuating mechanism to control the time of operation of each set of stoker members, the timing mechanism having means for providing a number of series of step by step motions, equal to the number of sets of stoker members in each unit, the number of motions in each series exceeding the number of units, the connections from the timing mechanism to each actuating mechanism including a cam path, all said cam paths being rigidly connected to move together and connected to said timing mechanism to be driven thereby and a follower therefor, each follower being connected to the corresponding actuating mechanism and each cam path having an actuating portion which, on being engaged by the follower causes the actuating mechanism to operate the corresponding set of members, the cam paths being so related to the followers and to the timing mechanism that the first steps of each series brings a follower into engagement with the actuating portion of the corresponding cam path to operate the corresponding actuating mechanism and the corresponding set of stoker bars, the succeeding step moving the said follower away from the actuating portion of said cam path bringing the next follower into engagement with the actuating portion of the next cam path, the last step of the series removing the last follower actuated from the actuating portion of its cam path, leaving all the sets of stoker members in normal retracted position, all said cam paths having dwell points which are simultaneously engaged by the followers for this purpose.

6. The combination with a stoking grate comprising a plurality of units, each unit consisting of a plurality of sets of stoker members which in their normal position present a fuel bed supporting surface and are mounted to move upwardly into said fuel bed from normal position and are provided with means connecting the members of each set together to move together, of timing and actuating mechanism for said sets comprising a source of power comprising a fluid pressure motor and means for leading fluid thereto under pressure, means for regulating said fluid supply whereby the motor delivers a pre-determined minimum of power, a separate actuating mechanism for each set connected to the source of power to be driven thereby and connected to the corresponding set of stoker members to operate the same and means for immediately returning the stoker members of each set to normal retracted position from which they are advanced in the stoking operation leaving no dwell of the bars in advanced position, the timing means comprising a timing member for each set with suitable connections to operate the same, separate connections from each timing member to the corresponding actuating mechanism to control the time of operation of each set of stoker members, the timing mechanism also comprising means for providing a number of series of step by step motions, with an interval between each series, the motions in each series exceeding the number of units by one step, the timing and actuating mechanism including means whereby each step of each series which corresponds to a set of stoker members times an operation of that set of stoker members the later steps in each series serving to prevent continued operation of the set of bars last operated, a booster valve having connections to a supply of fluid under pressure to supply excess power to the motor, said booster valve having control means connected to and adapted to be operated by the timing mechanism to supply excess power to the motor for a period during each series, said controlling means cutting off the power supplied by the booster valve in said interval between said series.

7. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of a source of power, means whereby said source is caused to deliver a predetermined minimum of power, an actuating mechanism for each set connected to the source of power to be driven thereby and connected to the corresponding set of stoker members to operate the same, means for immediately returning the stoker members of each set to normal retracted position from which they are advanced in the stoking operation, permitting no dwell of the members in advanced position, a timing mechanism with suitable connections from the source of power to be operated thereby, connections from the timing mechanism to each actuating mechanism to control the same and the time of operation of each set of stoker members, the timing mechanism having means for providing a number of series of step by step motions, the series being separated by a timed interval, means for adjusting said interval, the motions in each series corresponding to the number of units and exceeding the number of units, connections from the timing mechanism to each actuating mechanism including a cam path and a follower therefor having an actuating portion, the steps of each series prior to the last step serving to bring each follower in turn into engagement with the actuating portion of the corresponding cam path to cause operation of the corresponding actuating mechanism and the corresponding set of stoker members, the succeeding step serving to move said follower away from the actuating portion of its cam path bringing the next follower into engagement with the actuating portion of the next cam path, the last step of the series serving to remove the last follower actuated from the last actuating portion of its cam path, leaving all the sets of stoker members in normal retracted position, all said cam paths having dwell points which are simultaneously engaged by all the followers for this purpose, a booster for supplying excess power to the motor having control means controlled by the timing mechanism to supply excess power to the motor at all times when any follower engages the actuating portion of its cam and the stoker members of any set are advanced, the motor having a throttle valve and said excess power supply being independent of the throttle valve whereby it returns to normal retracted position any set of stoker members which may be advanced when the throttle is closed.

8. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of a fluid pressure motor, actuating connections from the motor to the sets of stoker members, timing means for said actuating connections whereby the sets of stoker members are operated in turn with a relatively prolonged dwell between some of the operations, means for limiting the power of the motor to a minimum sufficient for operating the timing and actuating mechanism and for cutting off said power, means for leading an excess supply of fluid to the motor and connections from the timing means for controlling said excess supply of fluid to provide excess power during the operation of the sets of stoker members and to cut off said excess supply during said dwell thereby providing for the use of minimum power between the operations of the sets of stoker members.

9. In a mechanical stoker, the combination with a plurality of sets of stoker members which in normal positions comprise a supporting surface for fuel bed, said members being movably mounted so that they can be advanced from said normal position into the fuel bed and retracted, and means connecting the members of each set together to be so moved together, of means for operating said sets of stoker members to advance them into the fuel bed and withdraw them to normal position, part of said sets being operated in turn in one series of operations and another part of said sets in turn in another series of operations, the series of operations being spaced by a predetermined interval in which all the sets are withdrawn, said means comprising separate actuating means for each set for advancing and returning the stoker members of each set immediately following the operation of that set, a source of power for operating said actuating means, timing mechanism operated from the source of power comprising a timing gear and also comprising a series of positively related timing members rigidly connected to each other and also connected to said timing gear to be operated thereby, each said timing member having a positive controlling element connected to the corresponding actuating means to time the operation of the corresponding set, the timing members being definitely spaced in the order of their motion to give corresponding sequence of operation of the sets, each timing member also having a dwell portion, engagement of which by its actuating element leaves the corresponding series of stoker members in normal withdrawn position, the dwells being in overlapping relation so that all the actuating means having operated in turn to advance the corresponding sets of stoker members which have been withdrawn, the actuating means are all inoperative at the same time for a period following each series of operations, all of the stoker members being at that time in normal withdrawn position and stationary, the timing gear having means providing for this purpose adjustable dwell periods coinciding with the overlapping dwell periods of the timing members giving a predetermined dwell between series of stoking operations, said timing gear being adjustable to vary the dwell.

10. The combination in a mechanical stoker of a grate having a plurality of sets of stoker members mounted to provide a fuel-supporting surface in the normal position of said members, means whereby the members of each set are connected together, the stoker members of the respective sets being supported and arranged to move at different times from the grate surface into the fire in the stoking operation, of a motor, timing means and a separate actuating unit for each set and connections whereby each actuating unit is driven from said motor, each actuating unit being connected to a set of stoker members to operate the same, each actuating unit comprising a separate continuously rocking pawl carrier and a pawl, a toothed member engaged thereby and connected to the corresponding stoker member to operate the same, the pawl carrier having an oscillating abutment, and the toothed member having an abutment to be engaged thereby in the advanced positions of the stoker member to return the stoker member to normal position, a pawl shield for each pawl to prevent the engagement of said pawl with the toothed member, each said shield having separate means whereby it is connected to the timing means to be operated thereby thus to control the time of engagement of the pawl and the operation of the stoker member, each said shield connection comprising a shield operating member and said respective operating members being rigidly connected to each other and connected to the timing means to be driven thereby.

11. In a mechanical stoker, the combination with a plurality of sets of stoker members which in normal positions comprise a supporting surface for a fuel bed, said members being movably mounted so that they can be advanced from said normal position into the fuel bed and retracted, and means connecting the members of each set together to be moved together, a heavy duty ratchet wheel and a pawl therefor, power means for reciprocating said pawl, separate timing means for each set of stoker members, said timing means being positively secured together to move as a unit, a connection from said timing means to said ratchet wheel to operate said timing means from said ratchet wheel, a rotatable shield moving about the axis of said ratchet wheel to control said pawl, said ratchet wheel having a plurality of sets of teeth, each set including a deep tooth, the ratchet wheel being recessed at the back of each deep tooth to a less radius than the radius of the bases of the other teeth of the ratchet wheel, said sets of teeth being adapted to produce in cooperation with said pawl and shield a series of sets of operations, the sets being separated by intervals and each operation corresponding to a tooth of said set, the said shield having a pawl-supporting surface comprising an arcuate raised portion of greater radius than the ratchet teeth, said raised portion being adapted to support said pawl out of contact with said ratchet teeth, the shield also having two teeth having pawl-engaging portions of less radius than arcuate raised portions, said pawl being adapted to engage said latter teeth, the shield teeth being spaced similarly to the ratchet teeth which are spaced by a wide arc to give a step by step operation, the rearmost tooth of the shield being spaced inwardly in a radial direction to a greater extent than the forward tooth of the shield, the pawl-supporting surface of the shield also comprising a depressed portion which is located at the rear of the deep tooth and a supplementary pawl-supporting surface extending forwardly from the top of the deep tooth to the base of the forward tooth, the forward tooth of the shield being adapted to be engaged by the pawl simultaneously with its engagement of the forward tooth of said set of teeth on the ratchet wheel, whereby the pawl rotates the shield forwardly for each series of steps, moving the ratchet wheel at the same time, each set of ratchet wheel teeth comprising an intermediate tooth which is next engaged by the pawl and the deep tooth of the shield being engaged by the pawl simultaneously with its engagement with the deep tooth of the ratchet wheel to advance the shield and the ratchet simultaneously on the last stroke of each series, placing the shield in a position in which it prevents further engagement of the pawl with the ratchet wheel, the pawl being on said raised portion, and a second ratchet wheel having a pawl connected to the power source to be operated thereby, said second ratchet wheel being connected to said pawl shield to move the shield between the respective series of steps from one operative position to another whereby the interval between said series is determined and an adjustably mounted shield for determining the length of the effective stroke of said second pawl and the timing of said second ratchet wheel and the first-mentioned pawl shield, a separate actuating mechanism for each set of stoker members, each actuating mechanism having separate connections whereby it is operated from said source of power and also having separate control means connected to the corresponding separate timing means for each set of stoker members and connecting means from each said actuating mechanism to the stoker members of the corresponding set whereby each set is operated in turn.

12. In a mechanical stoker, the combination of a plurality of stoker members which in normal position comprise a supporting surface for the fuel bed, said members being movably mounted so that they can be advanced from said normal position into the fuel bed and retracted to said normal position, said advance and retraction comprising the stoking operation, a motor of the fluid pressure type, means for supplying fluid under pressure to said motor and means for regulating said supply, actuating mechanism connected to the motor and to the respective stoker members for operating said stoker members in turn from said motor, mechanical timing mechanism for the actuating mechanism, connected to said motor to be operated thereby and comprising means for controlling the actuating mechanism and the operations of the stoker members, causing them to take place in pre-determined order and said timing mechanism also comprising means providing a dwell between certain of said operations, a booster valve and fluid pressure supply connections for supplying an excess of power to the motor by way of said valve, operating means for the booster valve to open and close the same and means connecting the said valve operating mechanism to the timing mechanism to be controlled thereby to open the valve in correspondence with the stoking operations to give an excess of power during each stoking operation and to close the valve for a period corresponding to each said dwell.

13. In a mechanical stoker, the combination with a plurality of sets of stoker members which in normal position comprise a supporting surface for a fuel bed, said members being movably mounted so that they can be advanced from said normal position into the fuel bed and retracted, thus performing a stoking operation, and means connecting the members of each set together to be moved together, a source of power, and ratchet and pawl mechanism for each set with connecting means from each ratchet to the corresponding set of stoker members to operate the same and return them to normal position, and means operatively connecting each pawl to the source of power, a timing shaft having a timing member for each set rigidly secured to the shaft, a timing mechanism connected to said shaft to operate the same and to said source of power to be operated thereby, a pawl shield for each said ratchet and pawl mechanism adapted to prevent the operation of the corresponding pawl, each said pawl shield having a connection to the corresponding timing member to be actuated thereby to time the operations of the corresponding ratchet and pawl mechanism, said timing mechanism comprising means for moving said timing shaft to cause each timing member in turn to operate its shield to permit the corresponding pawl to operate, said timing means also comprising means providing a dwell between certain of said operations whereby the operations of the respective sets are positively and definitely related and controlled, and means for adjusting the length of said dwell.

14. The combination with a stoking grate comprising a movable stoker member and additional means providing in the normal position of said movable stoker member a fuel bed supporting surface, said movable stoker member being mounted and adapted to be advanced from said surface into the fire and retracted in successive stoking operations—of means for operating said member in the performance of said stoking operations comprising a fluid pressure motor and means for supplying fluid under pressure thereto, mechanical operating mechanism for said movable stoker member and connections from said operating mechanism to said motor and connections from said operating mechanism to said movable member to operate the same, timing mechanism and connections from said timing mechanism to said motor to operate the timing mechanism, connections from the timing mechanism to the operating mechanism to control the same to operate the movable stoker member to advance it from and retract it to the fuel bed supporting surface in the stoking operations, said timing mechanism also comprising means providing a dwell between the stoking operations in which the said movable stoker member is withdrawn, means for regulating the supply of fluid to the motor to give a pre-determined generation of power and for cutting off said supply, a booster valve and fluid supply, connections from said valve to said motor and to a supply of fluid under pressure to supply excess fluid pressure to said motor and a timing control for said valve connected to said timing mechanism to open said valve during stoking operations to supply excess fluid pressure to said motor to prevent stoppage of the motor when the movable stoker member is advanced and to close said valve during said dwell when the movable stoker member is withdrawn.

15. In a furnace, a stoking mechanism comprising in combination, a plurality of inclined grate sections elongated in the direction of the incline, each section comprising a plurality of individual rocking grate members extending transversely to the direction of said sections and forming a fuel support, means at the upper end of the inclined grate sections for introducing fuel upon said sections, means connecting the alternate grate members in each section for causing the members of each respective set to rock in unison, grate set operating members having one end connected with the grate set connecting means and movable hangers for supporting the opposite end thereof, a separate support for receiving said movable hangers, a motor, a shaft adapted to be oscillated by said motor, operating means connecting the oscillating shaft with the movable hanger for operating the said grate sets, means associated with the movable hanger for disengaging the said hanger and oscillating shaft, a rotatable timing shaft operated by said motor, means on said timing shaft for successively operating the said disengaging means in predetermined relation whereby each grate set of the several sections is operated in turn and alternately as to the said sections, the selective operation of the respective grate sets being continued in the respective sections until all grate sets of each section have been operated, and being continued thereafter in the same uniform succession.

JAMES F. TURNER.
CHRISTIAN P. BREIDENBAUGH.